(12) United States Patent
Fay, II

(10) Patent No.: US 11,547,034 B2
(45) Date of Patent: Jan. 10, 2023

(54) LATERAL TRANSPORT SYSTEM FOR AN AGRICULTURAL MOWER

(71) Applicant: CNH Industrial America LLC, New Holland, PA (US)

(72) Inventor: Jeffrey B. Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 202 days.

(21) Appl. No.: 16/831,098

(22) Filed: Mar. 26, 2020

(65) Prior Publication Data
US 2021/0298214 A1    Sep. 30, 2021

(51) Int. Cl.
*A01B 73/00*    (2006.01)
*A01D 75/00*    (2006.01)
(Continued)

(52) U.S. Cl.
CPC ............ *A01B 59/04* (2013.01); *A01B 73/005* (2013.01); *A01D 34/00* (2013.01); *A01D 75/004* (2013.01)

(58) Field of Classification Search
CPC .................. A01B 59/00; A01B 59/042; A01B 59/04–048; A01B 73/00; A01B 73/005; A01D 34/00; A01D 34/412; A01D 34/63; A01D 34/64; A01D 34/66; A01D 34/664; A01D 34/665; A01D 89/00; A01D 43/10; A01D 43/107; A01D 75/00; A01D 75/002; A01D 75/004; A01D 75/006
See application file for complete search history.

(56) References Cited

U.S. PATENT DOCUMENTS 3,919,831 A * 11/1975 Halls .................... A01D 75/002
56/228
4,986,064 A * 1/1991 Ermacora ............ A01B 73/005
56/228
(Continued)

FOREIGN PATENT DOCUMENTS

EP        0 628 237 B1    8/1997
EP        2656712 A1    10/2013
(Continued)

OTHER PUBLICATIONS

Extended European Search Report for EP Application No. 21164712.8 dated Jul. 29, 2021 (seven pages).

*Primary Examiner* — Adam J Behrens
(74) *Attorney, Agent, or Firm* — Peter Zacharias; Patrick Sheldrake

(57) ABSTRACT

An agricultural mowing device that includes a tongue configured for connecting to an agricultural vehicle, a trail frame rotatably connected to the tongue about an axis of rotation, a first trail-frame wheel and a second trail-frame wheel each being rotatably connected to the trail frame, and a cutter bar connected to the trail frame. The cutter bar includes a front end and a back end. The mowing device also includes a transport system that has a transport frame rotatably connected to the tongue and a first transport wheel and a second transport wheel each being rotatably connected to the transport frame. In the transport position, the first and second transport wheels support the trail frame. The first transport wheel is radially closer to the axis of rotation of the trail frame than the front end of the cutter bar in the transport position.

20 Claims, 6 Drawing Sheets

(51) Int. Cl.
  *A01B 59/04*    (2006.01)
  *A01D 34/00*    (2006.01)

(56)         References Cited

U.S. PATENT DOCUMENTS

| | | | | |
|---|---|---|---|---|
| 5,136,828 | A * | 8/1992 | Ermacora | A01B 63/00 |
| | | | | 280/43.23 |
| 6,681,866 | B1 | 1/2004 | Raducha et al. | |
| 6,907,719 | B2 * | 6/2005 | Ligouy | A01B 73/005 |
| | | | | 56/15.1 |
| 9,179,591 | B2 * | 11/2015 | Barnett | A01B 69/003 |
| 9,526,204 | B2 * | 12/2016 | Rude | A01D 75/002 |
| 9,603,306 | B2 | 3/2017 | Fay, II | |
| 10,143,138 | B2 * | 12/2018 | Fay, II | A01B 73/005 |
| 2015/0068177 | A1 * | 3/2015 | Harkcom | A01D 34/66 |
| | | | | 56/15.5 |
| 2015/0313083 | A1 | 11/2015 | Fay, II et al. | |
| 2016/0007534 | A1 * | 1/2016 | Fay, II | A01B 73/005 |
| | | | | 56/228 |
| 2016/0066509 | A1 * | 3/2016 | Fay, II | A01D 57/28 |
| | | | | 56/192 |
| 2019/0200511 | A1 * | 7/2019 | Fay, II | A01D 43/06 |

FOREIGN PATENT DOCUMENTS

GB      2 232 055 A    12/1990
WO       95/28825 A1   11/1995

* cited by examiner

LATERAL TRANSPORT SYSTEM FOR AN AGRICULTURAL MOWER

BACKGROUND OF THE INVENTION

The present invention pertains to an agricultural mowing device and, more specifically, to a transport system for the agricultural mowing device.

A farmer may use an agricultural mowing device, such as mower or mower conditioner, to cut crop material like hay or grass and deposit the cut crop material onto the field in windrows or swaths. Typically, the mowing device is towed behind an agricultural vehicle, such as a tractor. For cutting large fields, many mowing assemblies include a driving vehicle that pushes a mower conditioner in front of the vehicle while simultaneously pulling another mower conditioner behind the vehicle.

A mower generally includes a tongue connectable to the tractor, a subframe, i.e., trail frame, a cutting device, and a transport system. A mower conditioner additionally includes conditioning rollers for conditioning the cut crop material. The mower can be variously configured as a disc, sickle, or drum mower wherein the cutting device includes a series of rotatable discs, a sickle bar, or a rotating drum, respectively. In a disc-type mower, such as a Discbine®, the disc cutter bar may generally include multiple juxtaposed cutterheads for cutting the standing crop. Each cutterhead may consist of a rotating disc with diametrically opposed cutting blades or knives affixed to the body of the disc.

The transport system of a pull-behind mowing device is used to reduce the overall profile of the mowing device for transportation thereof. Generally, due to practical or regulatory limits, the width of the mowing device in its operating orientation prevents the towed transportation of the mowing device on farm lanes, roadways, or through gates. To reduce the width of the mowing device, the transport system may include a separate transport trailer or an integrated transport subframe with transport wheels that selectively support the mowing device.

The separate transport trailer may reorient the mowing device and carry the mowing device with its width extending along the longitudinal length of the transport trailer. In this regard, the mowing device is arranged parallel to the forward direction of travel of the towing vehicle. Such transport trailers may be useful; however, these transport trailers may add significant cost to the overall mowing operation. For instance, such transport trailers must be separately purchased, maintained, and transported between the various fields and farm headquarters, which increases the operating cost of a mowing operation.

Integrated transport systems typically include a pivotable subframe with wheels for selectively supporting the mower and multiple actuators for pivoting the mower to be parallel with the forward direction of travel of the towing vehicle. Integrated transport systems can be more convenient than separate transport trailers; however, the added components may significantly increase the overall weight of the mower package. Also, in the transport position, the weight of the mowing device may be unevenly distributed amongst the transport wheels. For instance, in the transport position, a traditional integrated transport system may unevenly balance the weight of the cutter bar such that the right wheel may carry more weight, such as 1.5-2 times more weight, than the left wheel. This uneven weight distribution may lead to excess wear on the system and increase the overall cost of the transport system since larger wheels are typically required to support the uneven weight, even though only one wheel actually supports the excess weight. Furthermore, traditional transport systems for center pivot mowers attach to the trail frame of the mower. Therefore, the transport systems move with the trail frame during field maneuvers, for example when the mower moves in between its field left and right positions. The added weight of the transport system introduces a large amount of inertia to the system, which may cause discomfort and instability to the operator when the field position changes quickly.

What is needed in the art is a cost-effective and efficient integrated lateral transport system for a mowing device.

SUMMARY OF THE INVENTION

In one exemplary embodiment formed in accordance with the present invention, there is provided an agricultural mowing device that includes a lateral transport system. The lateral transport system generally includes a transport frame connected to the side of the tongue of the mowing device, first and second transport wheels rotatably connected to the transport frame, and a transport actuating mechanism for positioning the transport frame in between a retracted, stowed position and an extended, support position for transporting the mowing device. The first transport wheel is radially closer to the axis of rotation of the trail frame of the mowing device than the front end of the cutter bar of the mowing device in the transport position. Therein, both of the first and second transport wheels are located behind the front edge of the cutter bar in the transport position.

In another exemplary embodiment formed in accordance with the present invention, there is provided an agricultural mowing device configured for being towed behind an agricultural vehicle. The agricultural mowing device is configurable in a field position for cutting a crop material in a field and a transport position for transporting the agricultural mowing device. The agricultural mowing device includes a tongue configured for connecting to the agricultural vehicle, a trail frame rotatably connected to the tongue about an axis of rotation, a first trail-frame wheel and a second trail-frame wheel each being rotatably connected to the trail frame and configured for supporting the trail frame in the field position, and a cutter bar connected to the trail frame and configured for cutting the crop material in the field position. The cutter bar includes a front end and a back end being located behind the front end in a direction of crop material flow. The agricultural mowing device also includes a transport system that includes a transport frame rotatably connected to the tongue and a first transport wheel and a second transport wheel each being rotatably connected to the transport frame and configured for supporting the tongue in the transport position. The first transport wheel is radially closer to the axis of rotation of the trail frame than the front end of the cutter bar in the transport position.

In yet another exemplary embodiment formed in accordance with the present invention, there is provided an agricultural mowing assembly that includes an agricultural vehicle and an agricultural mowing device configured for being towed by the agricultural vehicle. The agricultural mowing device is configurable in a field position for cutting a crop material in a field and a transport position for transporting the agricultural mowing device. The agricultural mowing device includes a tongue connected to the agricultural vehicle, a trail frame rotatably connected to the tongue about an axis of rotation, a first trail-frame wheel and a second trail-frame wheel each being rotatably connected to the trail frame and configured for supporting the trail frame in the field position, and a cutter bar connected to the trail frame and configured for cutting the crop material in the field position. The cutter bar includes a front end and a back end being located behind the front end in a direction of crop material flow. The agricultural mowing device also includes a transport system that includes a transport frame rotatably connected to the tongue and a first transport wheel and a second transport wheel each being rotatably connected to the transport frame and configured for supporting the tongue in the transport position. The first transport wheel is radially closer to the axis of rotation of the trail frame than the front end of the cutter bar in the transport position.

In yet another exemplary embodiment formed in accordance with the present invention, there is provided a method for operating an agricultural mowing assembly. The method includes an initial step of providing an agricultural mowing device configured for being towed behind an agricultural vehicle. The agricultural mowing device is configurable in a field position for cutting a crop material in a field and a transport position for transporting the agricultural mowing device. The agricultural mowing device includes a tongue configured for connecting to the agricultural vehicle, a trail frame rotatably connected to the tongue about an axis of rotation, a first trail-frame wheel and a second trail-frame wheel each being rotatably connected to the trail frame and configured for supporting the trail frame in the field position, and a cutter bar connected to the trail frame and configured for cutting the crop material in the field position. The cutter bar includes a front end and a back end being located behind the front end in a direction of crop material flow. The agricultural mowing device also includes a transport system that includes a transport frame rotatably connected to the tongue and a first transport wheel and a second transport wheel each being rotatably connected to the transport frame and configured for supporting the tongue in the transport position. The first transport wheel is radially closer to the axis of rotation of the trail frame than the front end of the cutter bar in the transport position. The method also includes the step of positioning the agricultural mowing device in the transport position by rotating the transport frame from a retracted stowed position into an extended support position wherein the first transport wheel and the second transport wheel support the trail frame, and rotating the trail frame about the axis of rotation such that trail frame is substantially aligned with the tongue for reducing an overall width of the agricultural mowing device. The method also includes the step of positioning the agricultural mowing device in the field position by rotating the trail frame about the axis of rotation such that the trail frame is substantially perpendicular to tongue for increasing the overall width of the agricultural mowing device, and rotating the transport frame from the extended support position to the retracted stowed position wherein the transport frame is located above the trail frame.

One possible advantage of the exemplary embodiment of the transport system of the mowing device is that the weight of the mower is more evenly distributed onto the transport wheels in the transport position because the transport wheels are both located behind the front end of the cutter bar of the mower.

Another possible advantage of the exemplary embodiment of the transport system of the mowing device is that the transport actuating mechanism may reduce the overall cost and complexity of the transport system because only a single transport actuator is needed to deploy and retract the transport wheels.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
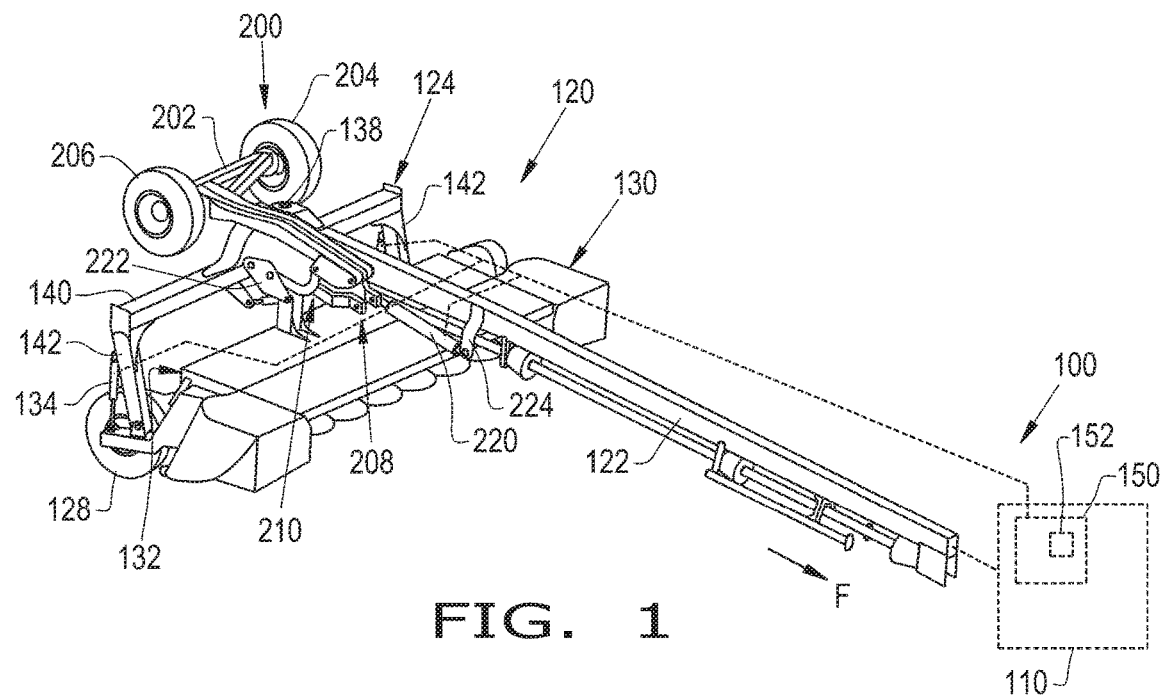
FIG. 1 illustrates a perspective view of an exemplary embodiment of an agricultural mowing assembly, the agricultural mowing assembly including an agricultural vehicle and a towed agricultural mowing device, the agricultural mowing device includes a tongue and a transport system connected to the tongue, in accordance with an exemplary embodiment of the present invention.

The terms "forward", "rearward", "left" and "right", when used in connection with the agricultural mower and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Referring now to the drawings, and more particularly to FIGS. 1-9, there is shown an agricultural mowing assembly 100 that includes an agricultural vehicle 110 and an agricultural mowing device 120, which is towed by the agricultural vehicle 110 in a forward direction of travel F. The agricultural vehicle 110 generally includes a chassis, a prime mover, wheels and/or tracts, and a cab for housing the operator. The vehicle 110 can be in the form of any desired agricultural vehicle, such as a tractor or self-propelled windrower.

Figure 5:
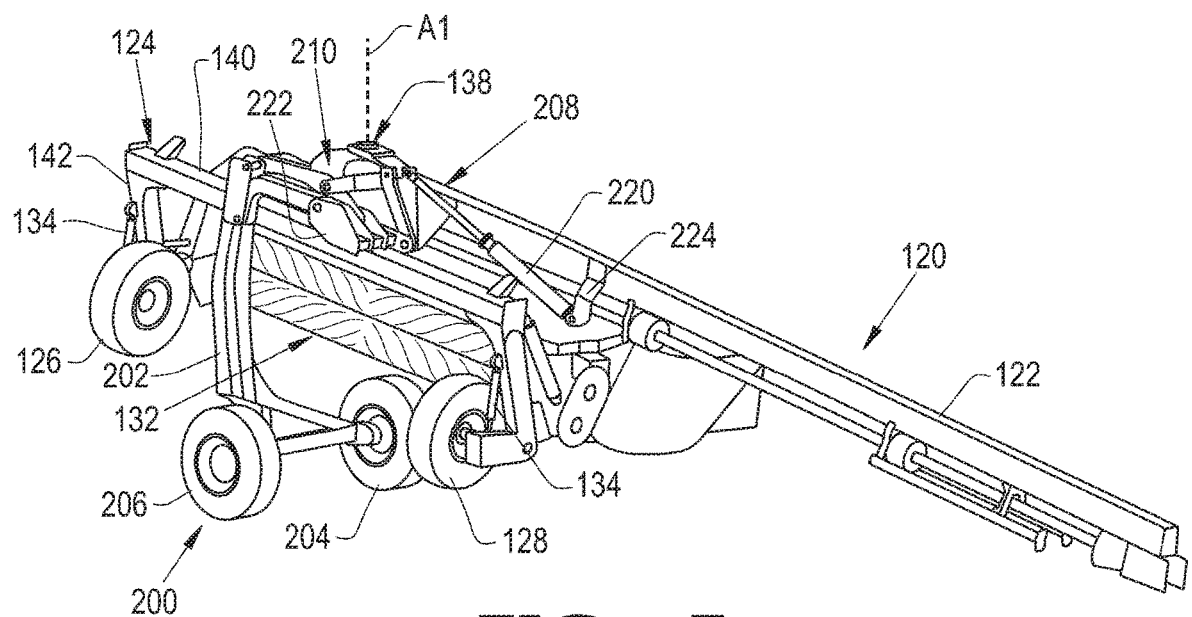
FIG. 5 illustrates a side perspective view of the agricultural mowing device of FIGS. 1-4, with the agricultural mowing device in a transport position wherein the transport system deployed for supporting the agricultural mowing device.

The mowing device 120 may be in the form of a center pivot mower or mower conditioner 120. As shown, the mowing device 120 is in the form of a center pivot mower conditioner 120. However, the mowing device 120 may be in the form of any desired mowing device. The mowing device 120 is configurable in a field position for cutting a crop material in the field (FIGS. 1-2) and a transport position for transporting the agricultural mowing device 120 (FIG. 5). The mowing device 120 may generally include a tongue 122 connected to the agricultural vehicle 110, a trail frame 124 rotatably connected to the tongue 122 about an axis of rotation A1, trail-frame wheels 126, 128, a cutter bar 130, a pair of conditioning rollers 132, a pair of lift actuators 134 connected to the trail-frame wheels 126, 128, a trail-frame actuating mechanism 136 for rotating the trail frame 124 and the cutter bar 130 therewith, and a lateral transport system 200 connected to the tongue 122 for selectively supporting the mowing device 120 in the transport position. The mowing device 120 may also include a controller 150, with a memory 152, for automatically controlling the trail-frame actuating mechanism 136 and the transport system 200.

The tongue 122 removably connects to the agricultural vehicle 110. The tongue 122 has a first, proximal end and a second, distal end. The first end of the tongue 122 is connected to the agricultural vehicle 110. The second end of the tongue 122 rotatably mounts the trail frame 124 about the axis of rotation. The second end of the tongue 122 may rotatably mount the trail frame 124 via any desired mounting bracket 138. The tongue 122 may comprise any desired material, such as metal.

The trail frame 124 is rotatably connected to the tongue 122 via the mounting bracket 138 and the trail frame 124 accordingly rotates about the vertical axis of rotation A1. The trail frame 124 has a horizontal main beam 140 and a pair of vertical side beams 142 which downwardly extend from the main beam 140. The main beam 140 is rotatably connected to the tongue 122 about the axis of rotation A1. The main beam 140 is located underneath the transport system 200. The side beams 142 respectively rotatably mount the trail-frame wheels 126, 128. The trail frame 124 supports the weight of the mowing device 120 in the field position but the trail frame 124 does not support the weight of the mowing device 120 in the transport position. Hence, the trail-frame wheels 126, 128 support the trail frame 124 in the field position but do not support the trail frame 124, or any other component of the mowing device 120, in the transport position (FIG. 5). The trail frame 124 may comprise any desired shape and material.

Figure 7:
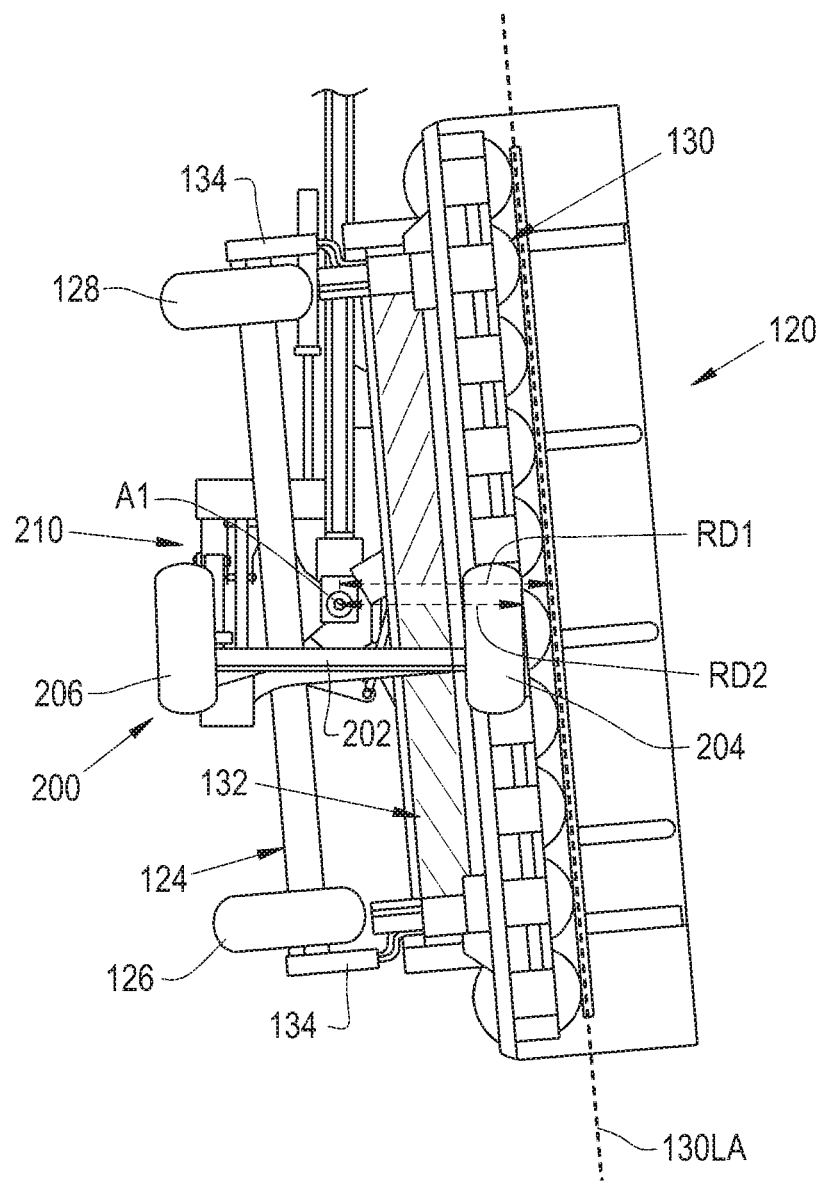
FIG. 7 illustrates a bottom view of the agricultural mowing device of FIGS. 1-6, with the agricultural mowing device in the transport position.
Figure 8:
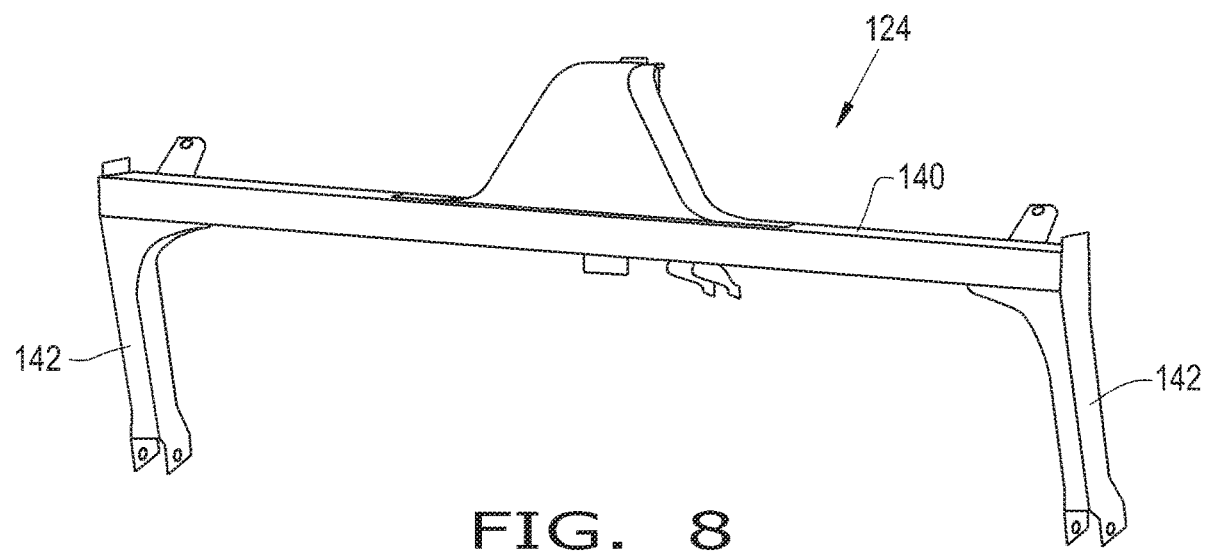
FIG. 8 illustrates a perspective view of the trail frame of the agricultural mowing device of FIGS. 1-7.

The cutter bar 130 is connected to the trail frame 124. The cutter bar 130 cuts the crop material in the field position. The cutter bar 130 may be in the form of any desired cutter bar 130, such as a sickle bar or rotating disc cutter bar. The cutter bar 130 has a front end or edge and a back end or edge that is located behind the front end in a direction of crop material flow, i.e., opposite to the forward direction travel F. The front end of the cutter bar 130 defines a front longitudinal axis 130LA (FIG. 7). It should be appreciated that the front edge of the cutter bar 130 may be defined by the front edge of the rock guards.

The conditioning rollers 132 are located downstream of the cutter bar 130. The conditioning rollers 132 condition the crop material as it exits the mowing device 120. The conditioning rollers 132 may be in the form of any desired rollers. As can be appreciated, the mowing device 120 may or may not include conditioning rollers 132.

The lift actuators 134 are respectively connected in between the trail frame 124 and the trail-frame wheels 126, 128. More particularly, each lift actuator 134 is transversely connected in between the trail frame 124 and an extension bracket (unnumbered) of a respective trail-frame wheel 126, 128. The lift actuators 134 pivot the trail-frame wheels 126, 128 up or down to thereby raise or lower the trail frame 124, i.e., the rear of the mowing device 120. Thereby, the lift actuators 134 may create additional clearance or space for allowing the transport system 200 to move into a position for supporting the mowing device 120. The lift actuators 134 may be in the form of any desired hydraulic and/or electric cylinders. For example, the lift actuators 134 may be in the form of hydraulic lift cylinders 134 which are hydraulically connected to the hydraulic system of agricultural vehicle 110 via one or more fluid lines.

The trail-frame actuating mechanism 136 is operably connected to the trail frame 124 and the tongue 122. The trail-frame actuating mechanism 136 rotates the trail frame 124 in between its field right or left positions and its lateral position for transport. As used herein, the field right and left positions of the trail frame 124 may refer to any desired field-operating orientation of the trail frame 124 in which the trail frame 124 is not perpendicular to the tongue 122. The trail-frame actuating mechanism 136 includes a rotational link 144, a first trail-frame actuator 146, and a second trail-frame actuator 148. The rotational link 144 is rotatably connected to the tongue 122 and extends outwardly from the tongue 122. The rotational link 144 may be in the form of a flat plate. The rotational link 144 operably connects the first and second trail-frame actuators 146, 148 to the tongue 122 at a location which is distally located away from the tongue 122 so that the first and second trail-frame actuators 146, 148 may act in conjunction to swing the trail frame 124 between its field right and left positions and also rotate the trail frame 124 into and out of its lateral position in the transport position. The rotational link 144 is capable of rotating forwardly or rearwardly relative to the tongue 122 upon retraction or extension of the first and/or second trail-frame actuators 146, 148. The first trail-frame actuator 146 is connected to the trail frame 124 and the rotational link 144. The second trail-frame actuator 148 is connected to the tongue 122 and the rotational link 144. The first and/or second trail-frame actuator 146, 148 may be used to rotate the trail frame 124 throughout any desired position of the trail frame 124. By way of example only, the first trail-frame actuator 146 may be in the form of a field swing actuator 146 for rotating the trail frame 124 in between its field intermediate, right, and left positions. The second trail-frame actuator 148 may be in the form of a transport swing actuator 148 for rotating the trail frame 124 in between its lateral position for transport and its extended, e.g. substantially perpendicular, position for field operation. The first and second trail-frame actuators 146, 148 may be in the form of any desired hydraulic and/or electric cylinders. For example, the first and second trail-frame actuators 146, 148 may be in the form of hydraulic cylinders 146, 148 which are hydraulically connected to the hydraulic system of agricultural vehicle 110 via one or more fluid lines. As can be appreciated, the first and second trail-frame actuators 146, 148 may or may not be identical actuators.

Figure 2:
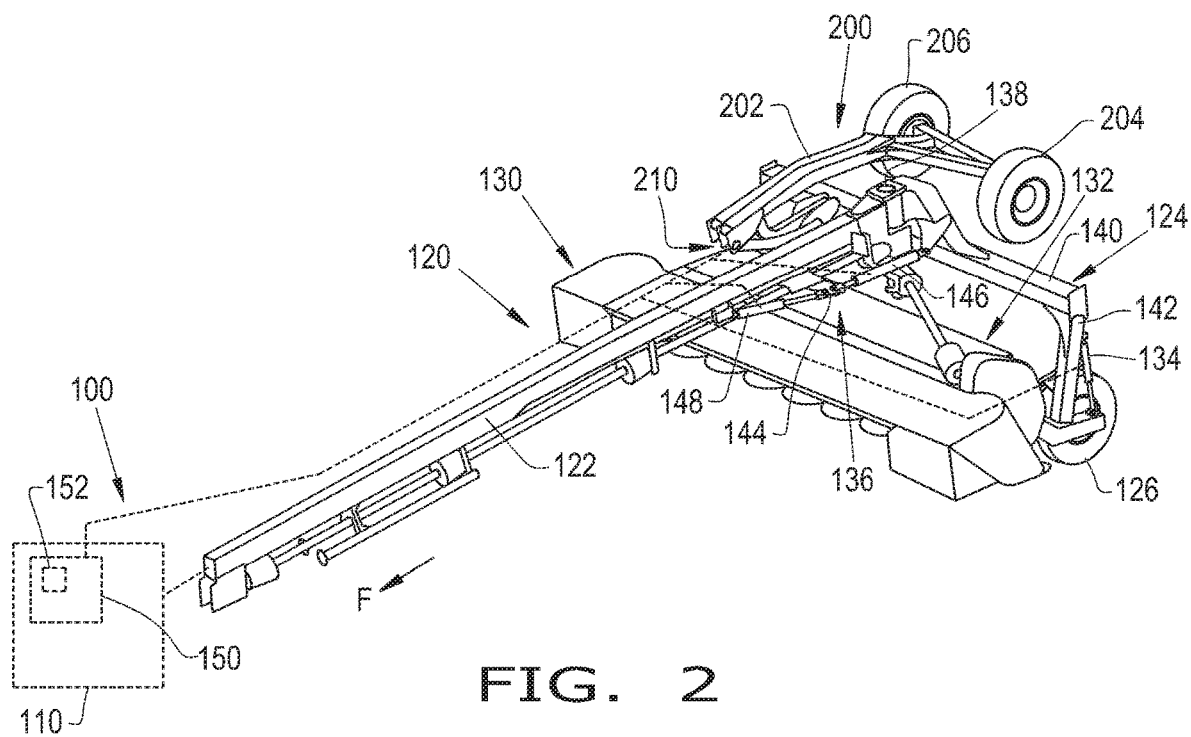
FIG. 2 illustrates another perspective view of the agricultural mowing assembly of FIG. 1.
Figure 3:
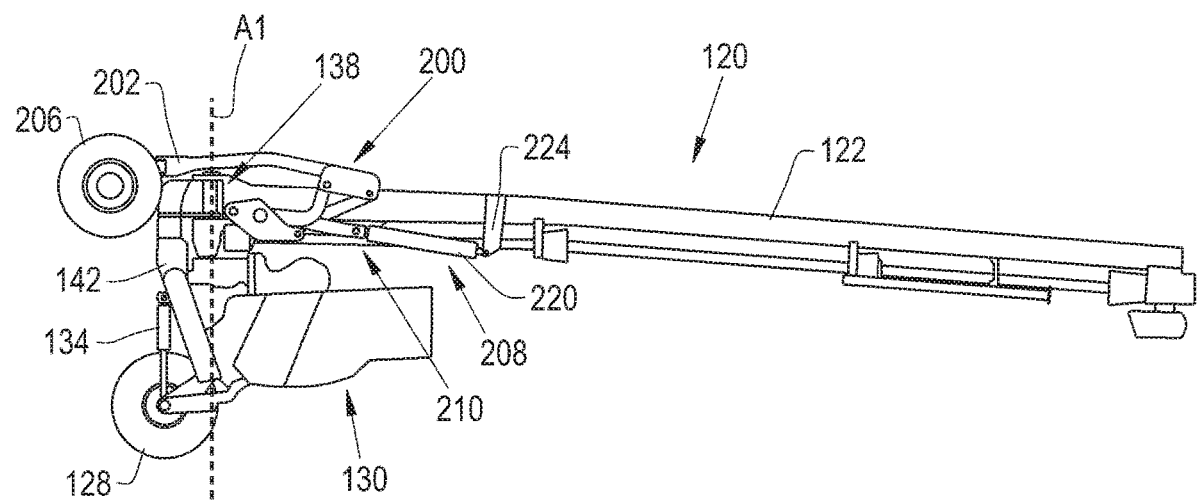
FIG. 3 illustrates a side view of the agricultural mowing device of FIGS. 1-2, with the transport system in a retracted stowed position.

The transport system 200 supports the mowing device 120, e.g. the trail frame 124, the cutter bar 130, and/or the tongue 122, in the transport position (FIG. 5) but does not support the mowing device 120 in the field position (FIGS. 1-2). The transport system 200 includes a transport frame 202 rotatably connected to the tongue 122, transport wheels 204, 206 rotatably connected to the transport frame 202, and a transport actuating mechanism 208 for movably, i.e., rotatably, connecting the transport frame 202 to the tongue 122. Since the transport system 200 is connected to the side of the tongue 122, the transport system 200 does not move in conjunction with the trail frame 124. Also, the side or lateral location of the transport system 200 allows the weight of the mowing device 120 to be more evenly distributed between the transport wheels 204, 206.

Figure 6:
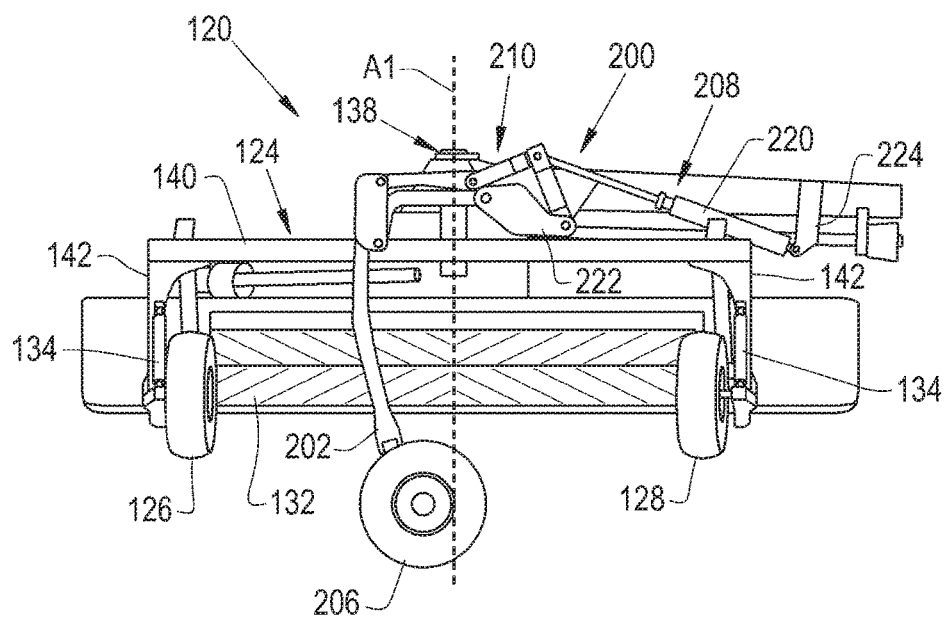
FIG. 6 illustrates a side view of the agricultural mowing device of FIGS. 1-5, with the agricultural mowing device in the transport position.

The transport frame 202 is rotatable in between a retracted stowed position in the field position wherein the transport frame 202 is located above the trail frame 124 (FIGS. 1-2) and an extended support position in the transport position wherein the transport wheels 204, 206 support the trail frame 124 (FIG. 5). The transport frame 202 is rotatably connected to the tongue 122, via the transport actuating mechanism 208, at a location which is forward of the axis of rotation A1 of the trail frame 124 in the direction of forward travel F. Hence, the transport frame 202 is at least partially located in front of the axis of rotation A1 of the trail frame 124 in the direction of forward travel F in the field position (FIG. 3), and the transport frame 202 is located rearwardly of the axis of rotation A1 of the trail frame 124 in the direction of forward travel F in the transport position (FIG. 6). The transport frame 202 rotates about a substantially horizontal axis of rotation, plus or minus 30 degrees. Also, the connection point of the transport frame 202 is located vertically above the main beam 140 of the trail frame 124. Thus, the main beam 140 is located underneath the transport frame 202 in the field position such that the main beam 140 passes underneath the transport wheels 204, 206 when the transport frame 202 is in the retracted stowed position in the field position. The transport frame 202 may include one or more beams which define a bent, elongated member and an axle for mounting the transport wheels 204, 206. Hence, the transport wheels 204, 206 are jointly mounted on a common axle. The transport frame 202 may comprise any desired shape and material.

The first and second transport wheels 204, 206 support the weight of the mowing device 120, e.g. the weight of the trail frame 124, the cutter bar 130, and/or the tongue 122, upon being fully deployed in the transport position of the mowing device 120. The first transport wheel 204 may be considered a front or left transport wheel 204, and the second transport wheel 206 may be considered a back or right transport wheel 206. The transport wheels 204, 206 may be identical and thus have the same material, size, and weight capacity. The transport wheels 204, 206 may comprise any desired wheels. The first transport wheel 204 is radially located closer to the axis of rotation A1 of the trail frame 124 than the front end of the cutter bar 130 in the transport position (FIG. 7). Hence, both transport wheels 204, 206 are located behind the front longitudinal axis 130LA of the front end of the cutter bar 130. As shown in FIG. 7, both transport wheels 204, 206 are located behind the front end of the cutter bar 130. In more detail, the front end, i.e., front longitudinal axis 130LA, of the cutter bar 130 is radially spaced apart from the axis of rotation A1 of the trail frame 124 at a first radial distance RD1 in the transport position, and the first transport wheel 204 is radially spaced apart from the axis of rotation A1 of the trail frame 124 at a second radial distance RD2 in the transport position (FIG. 7). The second radial distance RD2 is shorter than the first radial distance RD1. Since the front end of the cutter bar 130 is located in front of the transport wheels 204, 206, more weight is applied onto the first transport wheel 204, which in turn more evenly distributes the weight of the mowing device 120 between the front and rear transport wheels 204, 206.

Figure 9:
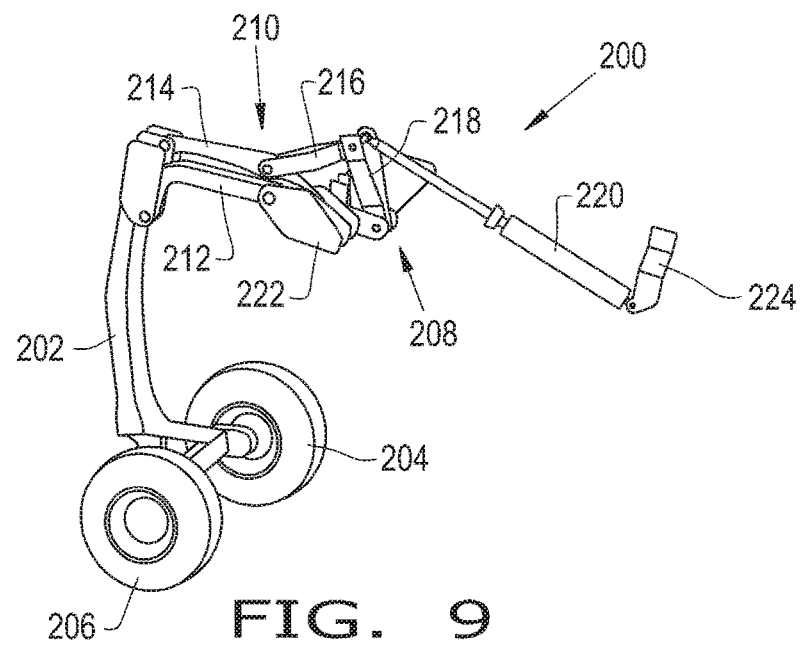
FIG. 9 illustrates a perspective view of the transport actuating mechanism of the transport system of FIGS. 1-7.

The transport actuating mechanism 208 includes a linkage assembly 210, with multiple links 212, 214, 216, 218, and a transport actuator 220 (FIG. 9). The transport actuating mechanism 208 may also include one or more brackets 222, 224 for mounting the linkage assembly 210 and the transport actuator 220 to the side of the tongue 122. For instance, one bracket 222 may be in the form of an elongated bracket that extends outwardly and perpendicularly from the side of the tongue 122, and another bracket 224 may be in the form of a shorter actuator bracket 224 that is connected to the side of the tongue 122 in front of the location point of the elongated bracket 222. The linkage assembly 210 is rotatably connected in between the transport frame 202 and the tongue 122. The linkage assembly 210 may include a first link 212 connected in between the elongated bracket 222 and the transport frame 202, a second, upper link 214 connected in between the elongated bracket 222 and the transport frame 202, a third link 216 connected to the second link 214, and a fourth link 218 connected to the elongated bracket 222, the third link 216, and the transport actuator 220 (FIG. 9). It should be appreciated that the linkage assembly 210 may include any desired number of links, such as two, three, four, five, or more links. The transport actuator 220 may be connected in between the linkage assembly 210, i.e., fourth link 218, and the tongue 122 via the actuator bracket 224. The transport actuator 220 may be in the form of any desired hydraulic and/or electrical cylinder. For instance, the transport actuator 220 may be in the form of a hydraulic cylinder 220 which is hydraulically connected to the hydraulic system of agricultural vehicle 110 via one or more fluid lines. The transport actuator 220 may be the only actuator for moving the transport frame 202.

The controller 150 is operably connected to the lift, trail-frame, and transport actuators 134, 146, 148, 220. The controller 150 may also be operably connected to a user interface within the cab of the agricultural vehicle 110. The controller 150 may automatically position the mowing device 120 in its transport position or field position upon the user inputting a corresponding command into the user interface. The controller 150 may be a standalone controller or integrated into the existing hardware and/or software of the agricultural vehicle 110 and/or mowing device 120.

Figure 4:
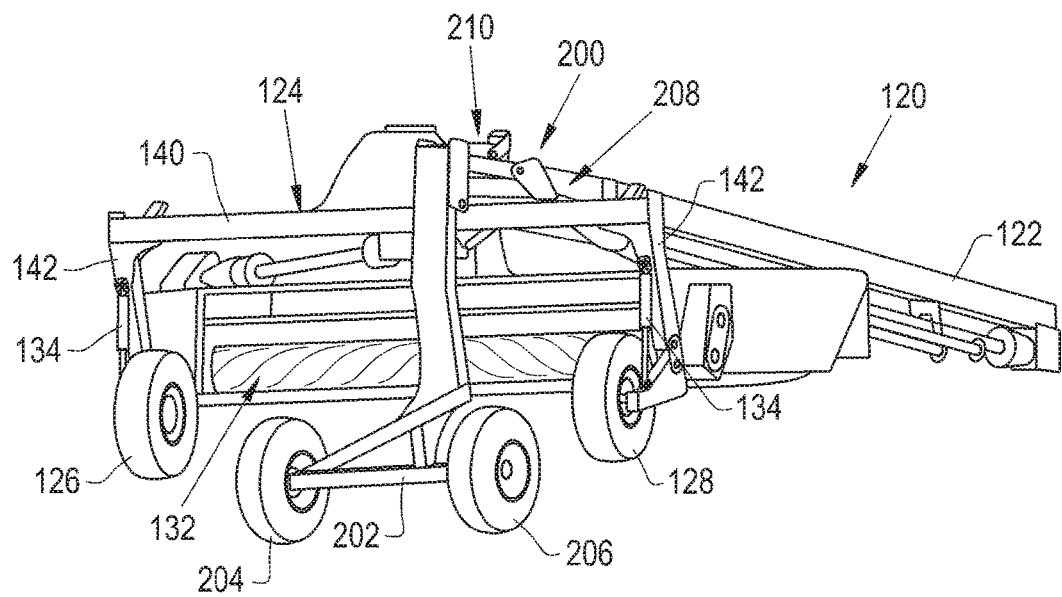
FIG. 4 illustrates a rear perspective view of the agricultural mowing device of FIGS. 2-3, with the transport system deployed and before lateral rotation of the trail frame.
Figure 10:
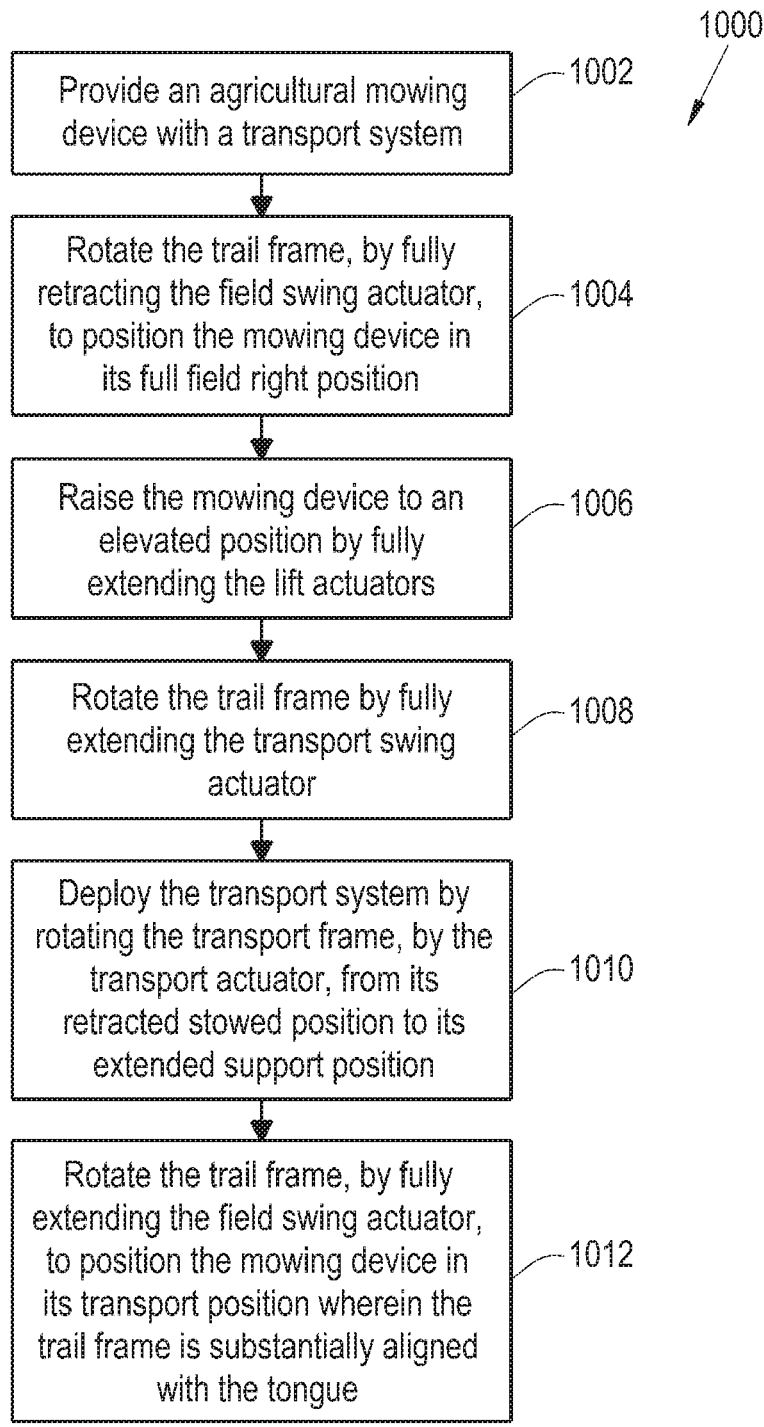
FIG. 10 illustrates a flow chart of a method for operating the agricultural mowing assembly, in accordance with an exemplary embodiment of the present invention.

Referring now to FIG. 10, there is shown a flowchart of a method 1000 for operating an agricultural mowing assembly 100. The method 1000 initially includes the step of providing the mowing device 120 with the transport system 200 as described above (at block 1002). The transport hydraulics may be prevented from operation until the mowing device 120 is positioned in its full field right or left position and then in its fully lifted position. Therefore, the mowing device 120 may be initially positioned in its full field right or left position by the field swing actuator 146 (at step 1004). For example, the mowing device 120 may be positioned in its full field right position by fully retracting the field swing actuator 146. Then, the mowing device 120 may be raised, by the lift actuators 134, in order to lift or raise the mowing device 120 in a fully elevated position (at block 1006). This fully elevated position provides additional ground clearance that enables the deployment of the transport system 200. It should be appreciated that the method step 1006 may occur first before the method step 1004. At this point, once the mowing device 120 is oriented in this lockout position, the transport hydraulics of the transport system 200 may be unlocked for allowing the operation thereof. Next, the trail frame 124 may be rotated once again by fully extending the transport swing actuator 148 (at block 1008). Thus, the trail frame 124 may be substantially perpendicular to the tongue 122, plus or minus 30 degrees, even though the field swing cylinder 146 has remained fully retracted. Then, to position the mowing device 120 in the transport position, the transport frame 202 may be fully deployed and the trail frame 124 may be rotated to accordingly reduce the overall width of the mowing device 120. For example, the transport system 200 may be deployed by rotating the transport frame 202, by the transport actuator 220, from its retracted stowed position into its extended support position (at block 1010; FIG. 4). Thereby, the transport wheels 204, 206 are moved toward the ground, and the transport wheels 204, 206 accordingly lift the trail-frame wheels 126, 128 off the ground. When the transport wheels 204, 206 are fully deployed, the trail frame 124 may be rotated, by fully extending the field swing actuator 146, so that the trail frame 124 is substantially aligned with the tongue 122, for example essentially parallel to the tongue 122, plus or minus 30 degrees (at block 1012; FIG. 5). In this laterally aligned position of the trail frame 124, both of the field and transport cylinders 146, 148 may be fully extended. Thereafter, the mowing device 120, which now has a smaller overall width, may be towed by the agricultural vehicle 110. As can be appreciated, the mowing device 120 may be positioned in the field position by performing the method steps 1012, 1010, 1008, 1006 of the method 1000 in reverse order. Therein, the transport frame 202 may be rotated from its extended support position into its retracted position, the trail frame 124 may be rotated to be substantially perpendicular to tongue 122, plus or minus 30 degrees, for increasing the overall width of the mowing device 120, and the mowing device 120 may be lowered by the lift actuators 134. It should be appreciated that the operator may stay within the cab of the agricultural vehicle 110 while the method 1000 is conducted by the controller 150.

It is to be understood that the steps of the method 1000 are performed by the controller 150 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 150 described herein, such as the method 1000, is implemented in software code or instructions which are tangibly stored on a tangible computer readable medium. The controller 150 loads the software code or instructions via a direct interface with the computer readable medium or via a wired and/or wireless network. Upon loading and executing such software code or instructions by the controller 150, the controller 150 may perform any of the functionality of the controller 150 described herein, including any steps of the method 1000 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural mowing device configured for being towed behind an agricultural vehicle, the agricultural mowing device being configurable in a field position for cutting a crop material in a field and a transport position for transporting the agricultural mowing device, the agricultural mowing device comprising:
   a tongue configured for connecting to the agricultural vehicle;
   a trail frame rotatably connected to the tongue about an axis of rotation;
   a first trail-frame wheel and a second trail-frame wheel each being rotatably connected to the trail frame and configured for supporting the trail frame in the field position;
   a cutter bar connected to the trail frame and configured for cutting the crop material in the field position, the cutter bar comprising a front end and a back end being located behind the front end in a direction of crop material flow; and
   a transport system, comprising:
      a transport frame rotatably connected to the tongue; and
      a first transport wheel and a second transport wheel each being rotatably connected to the transport frame and configured for supporting the tongue in the transport position, the first transport wheel being closer to the cutter bar than the second transport wheel, and the entire first transport wheel being positioned between the axis of rotation of the trail frame and the front end of the cutter bar in the transport position.

2. The agricultural mowing device of claim 1, wherein the front end of the cutter bar is radially spaced apart from the axis of rotation of the trail frame at a first radial distance in the transport position, and the first transport wheel is radially spaced apart from the axis of rotation of the trail frame at a second radial distance in the transport position, and the second radial distance of the first transport wheel is shorter than the first radial distance of the front end of the cutter bar such that the first transport wheel and the second transport wheel are both located behind the front end of the cutter bar in the transport position for evenly distributing a weight of the agricultural mowing device between the first transport wheel and the second transport wheel.

3. The agricultural mowing device of claim 1, wherein the transport frame is configured for being retracted and stowed in the field position wherein the transport frame is located above the trail frame; and extended in the transport position wherein the first transport wheel and the second transport wheel support the tongue.

4. The agricultural mowing device of claim 3, wherein the trail frame comprises a horizontal main beam rotatably connected to the tongue about the axis of rotation, and the main beam is located underneath the transport frame in the field position, a connection point of the transport frame is located vertically above the main beam.

5. The agricultural mowing device of claim 1, wherein the tongue comprises a first end and a second end, and the first end of the tongue is configured for connecting to the agricultural vehicle and the second end of the tongue rotatably mounts the trail frame about the axis of rotation, and the transport frame is rotatably connected to the tongue at a location that is forward of the axis of rotation of the trail frame in a direction of forward travel.

6. The agricultural mowing device of claim 5, wherein the transport frame is located rearwardly of the axis of rotation of the trail frame in the direction of forward travel in the transport position.

7. The agricultural mowing device of claim 1, wherein the transport system further comprises a transport actuating mechanism for rotatably connecting the transport frame to the tongue, and the transport actuating mechanism comprises a linkage assembly rotatably connected in between the transport frame and the tongue and a transport actuator connected in between the tongue and the linkage assembly.

8. The agricultural mowing device of claim 1, further comprising a trail-frame actuating mechanism operably connected to the trail frame and configured for rotating the trail frame, and the trail-frame actuating mechanism comprises a rotational link rotatably connected to the tongue and extending outwardly from the tongue, a first trail-frame actuator connected to the trail frame and the rotational link, and a second trail-frame actuator connected to the tongue and the rotational link.

9. An agricultural mowing assembly, comprising:
an agricultural vehicle; and
an agricultural mowing device configured for being towed by the agricultural vehicle, the agricultural mowing device being configurable in a field position for cutting a crop material in a field and a transport position for transporting the agricultural mowing device, the agricultural mowing device comprising:
a tongue connected to the agricultural vehicle;
a trail frame rotatably connected to the tongue about an axis of rotation;
a first trail-frame wheel and a second trail-frame wheel each being rotatably connected to the trail frame and configured for supporting the trail frame in the field position;
a cutter bar connected to the trail frame and configured for cutting the crop material in the field position, the cutter bar comprising a front end and a back end being located behind the front end in a direction of crop material flow; and
a transport system, comprising:
a transport frame rotatably connected to the tongue; and
a first transport wheel and a second transport wheel each being rotatably connected to the transport frame and configured for supporting the tongue in the transport position, the first transport wheel being closer to the cutter bar than the second transport wheel, and the entire first transport wheel being positioned between the axis of rotation of the trail frame and the front end of the cutter bar in the transport position.

10. The agricultural mowing assembly of claim 9, wherein the front end of the cutter bar is radially spaced apart from the axis of rotation of the trail frame at a first radial distance in the transport position, and the first transport wheel is radially spaced apart from the axis of rotation of the trail frame at a second radial distance in the transport position, and the second radial distance of the first transport wheel is shorter than the first radial distance of the front end of the cutter bar such that the first transport wheel and the second transport wheel are both located behind the front end of the cutter bar in the transport position for evenly distributing a weight of the agricultural mowing device between the first transport wheel and the second transport wheel.

11. The agricultural mowing assembly of claim 9, wherein the transport frame is configured for being retracted and stowed in the field position wherein the transport frame is located above the trail frame; and extended in the transport position wherein the first transport wheel and the second transport wheel support the tongue.

12. The agricultural mowing assembly of claim 11, wherein the trail frame comprises a horizontal main beam rotatably connected to the tongue about the axis of rotation, and the main beam is located underneath the transport frame in the field position.

13. The agricultural mowing assembly of claim 9, wherein the tongue comprises a first end and a second end, and the first end of the tongue is connected to the agricultural vehicle and the second end of the tongue rotatably mounts the trail frame about the axis of rotation, and the transport frame is rotatably connected to the tongue at a location that is forward of the axis of rotation of the trail frame in a direction of forward travel.

14. The agricultural mowing assembly of claim 13, wherein the transport frame is located rearwardly of the axis of rotation of the trail frame in the direction of forward travel in the transport position.

15. The agricultural mowing assembly of claim 9, wherein the transport system further comprises a transport actuating mechanism for rotatably connecting the transport frame to the tongue, and the transport actuating mechanism comprises a linkage assembly rotatably connected in between the transport frame and the tongue and a transport actuator connected in between the tongue and the linkage assembly.

16. The agricultural mowing assembly of claim 9, wherein the agricultural mowing device further comprises a trail-frame actuating mechanism operably connected to the trail frame and configured for rotating the trail frame, and the trail-frame actuating mechanism comprises a rotational link rotatably connected to the tongue and extending outwardly from the tongue, a first trail-frame actuator connected to the trail frame and the rotational link, and a second trail-frame actuator connected to the tongue and the rotational link.

17. A method for operating an agricultural mowing assembly, comprising:
providing an agricultural mowing device configured for being towed behind an agricultural vehicle, the agricultural mowing device being configurable in a field position for cutting a crop material in a field and a transport position for transporting the agricultural mowing device, the agricultural mowing device comprising a tongue configured for connecting to the agricultural vehicle, a trail frame rotatably connected to the tongue about an axis of rotation, a first trail-frame wheel and a second trail-frame wheel each being rotatably connected to the trail frame and configured for supporting the trail frame in the field position, a cutter bar connected to the trail frame and configured for cutting the crop material in the field position, the cutter bar comprising a front end and a back end being located behind the front end in a direction of crop material flow, and a transport system comprising a transport frame rotatably connected to the tongue and a first transport wheel and a second transport wheel each being rotatably connected to the transport frame and configured for supporting the tongue in the transport position, the first transport wheel being closer to the cutter bar than the second transport wheel, and the entire first transport wheel being positioned between the axis of rotation of the trail frame and the front end of the cutter bar in the transport position;

positioning the agricultural mowing device in the transport position by:
   rotating the transport frame from a retracted stowed position to an extended support position wherein the first transport wheel and the second transport wheel support the trail frame; and
   rotating the trail frame about the axis of rotation such that trail frame is substantially aligned with the tongue for reducing an overall width of the agricultural mowing device; and
positioning the agricultural mowing device in the field position by:
   rotating the trail frame about the axis of rotation such that the trail frame is substantially perpendicular to tongue for increasing the overall width of the agricultural mowing device; and
   rotating the transport frame from the extended support position to the retracted stowed position wherein the transport frame is located above the trail frame.

18. The method of claim 17, wherein the front end of the cutter bar is radially spaced apart from the axis of rotation of the trail frame at a first radial distance in the transport position, and the first transport wheel is radially spaced apart from the axis of rotation of the trail frame at a second radial distance in the transport position, and the second radial distance of the first transport wheel is shorter than the first radial distance of the front end of the cutter bar such that the first transport wheel and the second transport wheel are both located behind the front end of the cutter bar in the transport position for evenly distributing a weight of the agricultural mowing device between the first transport wheel and the second transport wheel.

19. The method of claim 17, wherein the trail frame comprises a horizontal main beam rotatably connected to the tongue about the axis of rotation, and the main beam is located underneath the transport frame in the field position.

20. The method of claim 17, wherein the tongue comprises a first end and a second end, and the first end of the tongue is connected to the agricultural vehicle and the second end of the tongue rotatably mounts the trail frame about the axis of rotation, and the transport frame is rotatably connected to the tongue at a location that is forward of the axis of rotation of the trail frame in a direction of forward travel.

\* \* \* \* \*